United States Patent
Lee et al.

(10) Patent No.: US 8,278,006 B2
(45) Date of Patent: Oct. 2, 2012

(54) FUEL CELL SYSTEM AND MOBILE COMMUNICATION DEVICE INCLUDING THE SAME

(75) Inventors: Jae-yong Lee, Seongnam-si (KR); Jung-min Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1134 days.

(21) Appl. No.: 11/434,718

(22) Filed: May 17, 2006

(65) Prior Publication Data

US 2006/0263672 A1    Nov. 23, 2006

(30) Foreign Application Priority Data

May 17, 2005  (KR) .................................. 2005-41285

(51) Int. Cl.
*H01M 8/04* (2006.01)
(52) U.S. Cl. ........................ 429/512; 429/513
(58) Field of Classification Search .................. 429/39
See application file for complete search history.

(56) References Cited

U.S. PATENT DOCUMENTS

| | | | |
|---|---|---|---|
| 3,724,213 A * | 4/1973 | Muller et al. ................ | 60/39.27 |
| 6,326,097 B1 * | 12/2001 | Hockaday ..................... | 429/34 |
| 2003/0008193 A1 | 1/2003 | Kinkelaar et al. | |
| 2004/0001987 A1 * | 1/2004 | Kinkelaar et al. ............ | 429/34 |
| 2004/0001991 A1 * | 1/2004 | Kinkelaar et al. ............ | 429/38 |
| 2004/0061474 A1 | 4/2004 | Ozeki | |
| 2005/0119034 A1 * | 6/2005 | Kato et al. ................. | 455/575.4 |
| 2005/0266281 A1 * | 12/2005 | Adams et al. ................. | 429/17 |

FOREIGN PATENT DOCUMENTS

| | | |
|---|---|---|
| CN | 2521833 Y | 11/2002 |
| CN | 1402369 | 3/2003 |
| CN | 2660807 Y | 12/2004 |
| CN | 1577929 | 2/2005 |
| CN | 1610871 | 4/2005 |
| EP | 1 521 322 B1 | 4/2008 |
| JP | 59-066066 | 4/1984 |
| JP | 2001-093551 | 4/2001 |
| JP | 2003-109633 | 4/2003 |
| JP | 2003-297411 | 10/2003 |
| JP | P2004-289995 A | 10/2004 |

OTHER PUBLICATIONS

Office Action issued in corresponding Chinese Patent Application No. 2006100818646 dated Dec. 12, 2008.
First Office Action issued Mar. 7, 2008 by the State Intellectual Property Office of the People's Republic of China re: Chinese Application No. 2006100818646 (10 pp).
Office Action issued by the Japanese Patent Office on Nov. 4, 2009.

* cited by examiner

*Primary Examiner* — Ula C Ruddock
*Assistant Examiner* — Jacob Marks
(74) *Attorney, Agent, or Firm* — Christie, Parker & Hale, LLP

(57) ABSTRACT

A fuel cell system includes: a cell pack including an anode layer, a cathode layer, and an electrolyte; a fuel tank separated from the cell pack, and having a hole; a fuel mixture unit connected to the cell pack; a fuel storage medium included in the fuel tank, and a part of which is exposed through the hole; and a fuel supplying path having a first end connected to the fuel mixture unit, and a second end connected to the fuel storage medium only when the fuel cell system operates. A mobile communication device includes the fuel cell system.

33 Claims, 22 Drawing Sheets

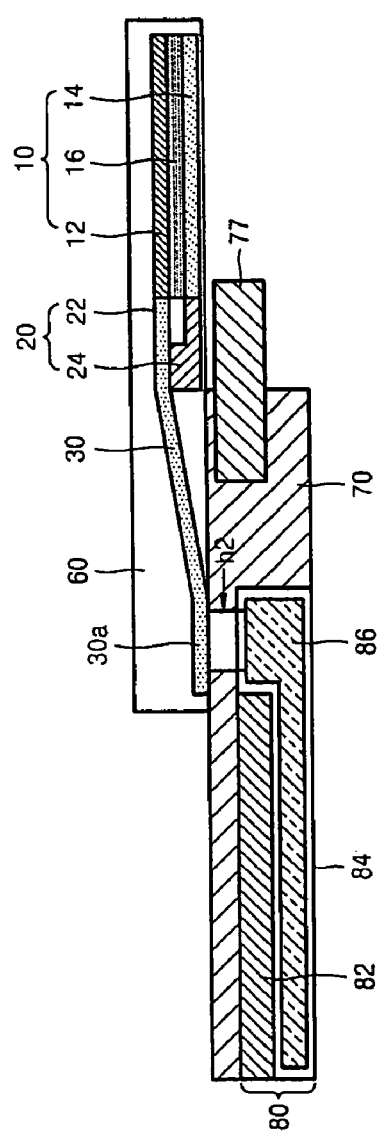
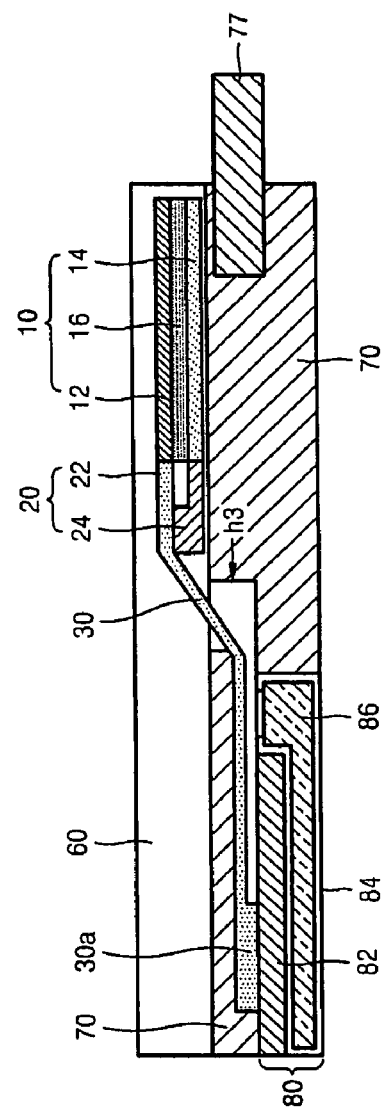

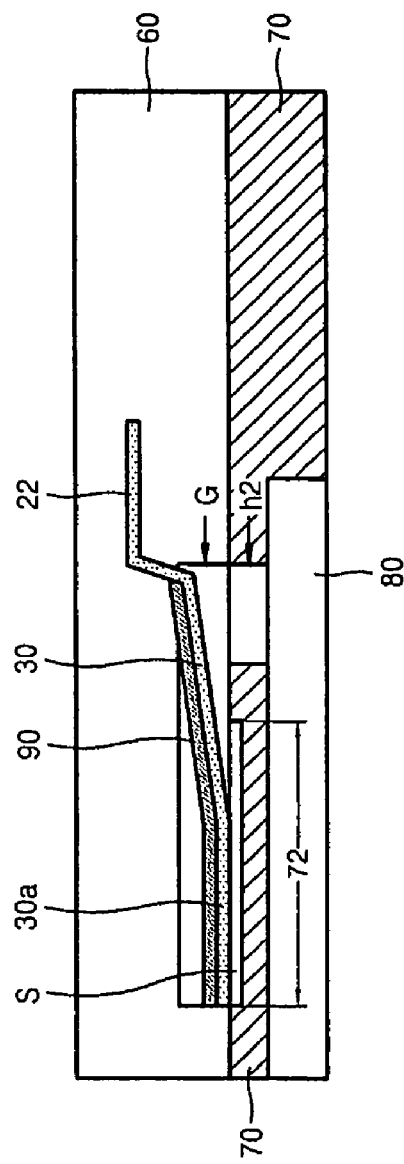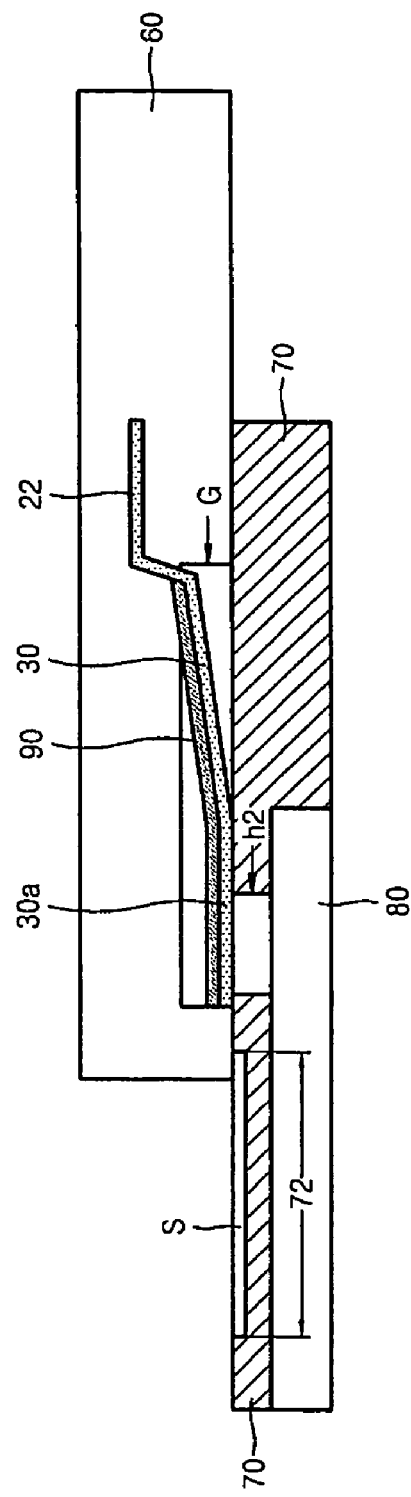

FUEL CELL SYSTEM AND MOBILE COMMUNICATION DEVICE INCLUDING THE SAME

CROSS-REFERENCE TO RELATED APPLICATIONS

This application claims the benefit of Korean Application No. 2005-41285, filed May 17, 2005, in the Korean Intellectual Property Office, the disclosure of which is incorporated herein by reference.

BACKGROUND OF THE INVENTION

1. Field of the Invention

Aspects of the present invention relate to a fuel cell and an electronic device including the fuel cell, and more particularly, to a fuel cell system and a mobile communication device including the fuel cell system.

2. Description of the Related Art

As Internet technologies have been continuously developed, the number of Internet users has increased, and wireless mobile communication devices have been used more frequently. Naturally, batteries with light weight, small size, and large capacity have been required for such devices. Accordingly, secondary batteries having light weight and long battery life have been desired. However, the battery life of the secondary battery is mostly standardized on the basis of standby time. Thus, in actual usage conditions, the battery life of the secondary battery is not long enough when operating time, in particular, communicating time, takes up a larger part of the battery's use. In addition, when a mobile communication device is also used as a digital camera, a camcorder, a portable memory, and/or a digital multimedia broadcasting (DMB) device, the battery life of the secondary battery is reduced.

Accordingly, fuel cells having higher power generation efficiency and total efficiency than those of the secondary batteries have been considered. Although there have not been many instances of fuel cells used in communication devices, fuel cells have been used in personal digital assistant (PDA) terminals or laptop computers.

A fuel cell is an electrochemical apparatus that transforms chemical energy of a liquid fuel into electrical energy via an electrochemical reaction. The basic principle of the fuel cell is a reaction of hydrogen, which is obtained by reforming fossil fuel such as petroleum or natural gas or by using pure hydrogen, with oxygen in the air. During the reaction, electric energy is generated, and heat and moist vapor are obtained as by-products.

The fuel cell can be distinguished from the secondary battery in that it can operate continuously as long as fuel is supplied from the outside.

Fuel cells can generally be divided into four types: phosphoric acid fuel cells (PAFCs), molten carbonate fuel cells (MCFCs), solid oxide fuel cells (SOFCs), and proton exchange membrane fuel cells (PEMFCs). PAFCs are commercialized, and the other types of fuel cells are in an experimental stage. Also, direct methanol fuel cells (DMFCs), which directly generate electricity from methanol without reforming the fuel (hydrogen extraction), and fuel cells using metal hydride are being developed.

In case of fuel cells for mobile communication devices, oxygen is supplied to a cathode of the fuel cell through a back side of the device. However, since the back side of the device is generally covered by the hand of a user, it may be difficult to supply the oxygen when the device is being used. Moreover, it may be difficult to rapidly remove heat generated by the device, and to discharge generated $CO_2$. In addition, a fuel tank is directly attached to an anode, and thus, when the fuel cell is mounted onto the device, the rear thickness of the device increases. Moreover, when the fuel tank is located behind a cell pack, it may be difficult to replace the fuel tank or supply the fuel.

SUMMARY OF THE INVENTION

Aspects of the present invention provide a fuel cell system that can supply air and discharge gas ($CO_2$) freely. The fuel cell system has a fuel cell with a reduced thickness and volume, and replacing of a fuel tank and supplying of fuel can be performed in a simple way.

Aspects of the present invention also provide a mobile communication device including the fuel cell system.

According to an aspect of the present invention, there is provided a fuel cell system including: a cell pack including an anode layer, a cathode layer, and an electrolyte; a fuel tank separated from the cell pack, and having a hole; a fuel mixture unit connected to the cell pack; a fuel storage medium included in the fuel tank, and wherein a part of the fuel storage medium is exposed through the hole; and a fuel supplying path having a first end connected to the fuel mixture unit, and a second end, wherein the second end is connected to the fuel storage medium only when the fuel cell system is in an operating mode.

According to an aspect of the present invention, the fuel mixture unit may include: a first capillary unit connected to the anode layer of the cell pack; and a second capillary unit connected to the cathode layer of the cell pack, wherein the first and the second capillary units are connected to the fuel supplying path. The first and the second capillary units may be formed as a porous medium or a wick structure through which a capillary force is applied. The fuel supplying path may be formed as a porous medium or a wick structure through which a capillary force is applied. The fuel storage medium may be a porous medium or a wick structure through which a capillary force is applied.

According to an aspect of the present invention, the fuel storage medium may occupy one part of the fuel tank, and the fuel may fill another part of the fuel tank. The fuel tank may be filled with the fuel, and the fuel storage medium may be provided at the hole.

According to another aspect of the present invention, there is provided a mobile communication device including: an upper panel including a display region; a lower panel engaged with the upper panel, and including keys for inputting/outputting data and searching information; a power unit mounted on one of the upper panel and the lower panel; and a fuel cell system having elements placed on one of the upper panel and the lower panel and on the power unit.

According to an aspect of the present invention, the fuel cell system may include: a cell pack including an anode layer, a cathode layer, and an electrolyte; a fuel tank separated from the cell pack, and including a hole; a fuel mixture unit connected to the cell pack; a fuel storage medium included in the fuel tank, wherein a part of the fuel storage medium is exposed through the hole; and a fuel supplying path having a first end connected to the fuel mixture unit, and a second end that is connected to the fuel storage medium only when the fuel cell system is in an operating mode.

According to an aspect of the present invention, the fuel storage medium may occupy one part of the fuel tank, and the fuel may fill another part of the fuel tank. The fuel storage medium may be a porous medium or a wick structure. The fuel tank may be filled with the fuel, and the fuel storage medium may be present at the hole.

According to an aspect of the present invention, structures of the fuel mixture unit and characteristics of the elements may be the same as those of the fuel cell system.

According to an aspect of the present invention, the fuel supplying path except for a portion contacting the fuel storage medium may be built in the upper panel.

According to an aspect of the present invention, a passageway through which the fuel supplying path passes may be provided in the lower panel, and the fuel supplying path is provided between the lower panel and the power unit. A part of the fuel supplying path contacting the fuel storage medium may be thicker than other portions of the fuel supplying path. The fuel supplying path may be supported by an elastic frame, and an end of the frame may be fixed onto a rear surface of the lower panel.

According to an aspect of the present invention, the upper panel may be provided to be movable, and the fuel supplying path may be provided in a groove formed in a rear surface of the upper panel. The fuel supplying path may be supported by an elastic frame, and an end of the frame may be fixed onto the upper panel. The region of the lower panel where the keys are provided may be lower than peripheral regions.

According to an aspect of the present invention, the power unit may include a battery.

According to an aspect of the present invention, the upper panel and the lower panel may be coupled to each other to be slidable or rotatable with respect to each other.

According to the present invention, since the fuel cell system is constructed using the idle area of the communication device, that is, an area of the communication device that is not used for electronics, etc., an increase in the thickness and volume of the communication device due to the fuel cell system can be minimized. In addition, the idle area, such as, for example, an upper rear portion of the upper panel in a sliding type cellular phone, is exposed to the atmosphere. In the communication device of the present invention, a path for inducing and discharging gas, such as, for example, a hole, may be formed on the idle area. Therefore, according to the present invention, the air can be induced freely, and gas generated during the operation of fuel cell system, such as, for example, carbon dioxide, can be discharged freely. In addition, the heat generated when the fuel cell is used can be discharged rapidly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 25 is a cross-sectional view of the mobile communication device in operating mode, taken along line 24-24' of FIG. 17;

FIGS. 26 and 27 are views of the mobile communication device of FIG. 17 when a fuel supplying path is installed between the lower panel and the fuel tank, wherein FIG. 26 is a cross-sectional view of the mobile communication device in a standby mode, and FIG. 27 is a cross-sectional view of the mobile communication device in operating mode;

FIGS. 28 and 29 are views of the mobile communication device of FIG. 17 when the fuel supplying path is installed between the upper panel and the lower panel, wherein FIG. 28 is a cross-sectional view of the mobile communication device in a standby mode, and FIG. 29 is a cross-sectional view of the mobile communication device in operating mode;

FIGS. 30 and 31 are cross-sectional views of the mobile communication device of FIGS. 28 and 29 when surfaces of button regions on the lower panel are lower than surfaces of peripheral regions;

FIGS. 34 and 35 are views of a swing type mobile communication device including the fuel cell system of FIG. 1, wherein FIG. 34 is a front view of the mobile communication device in an operating mode, and FIG. 35 is a front view of the mobile communication device in a standby mode.

DETAILED DESCRIPTION OF THE EMBODIMENTS

Figure 1:
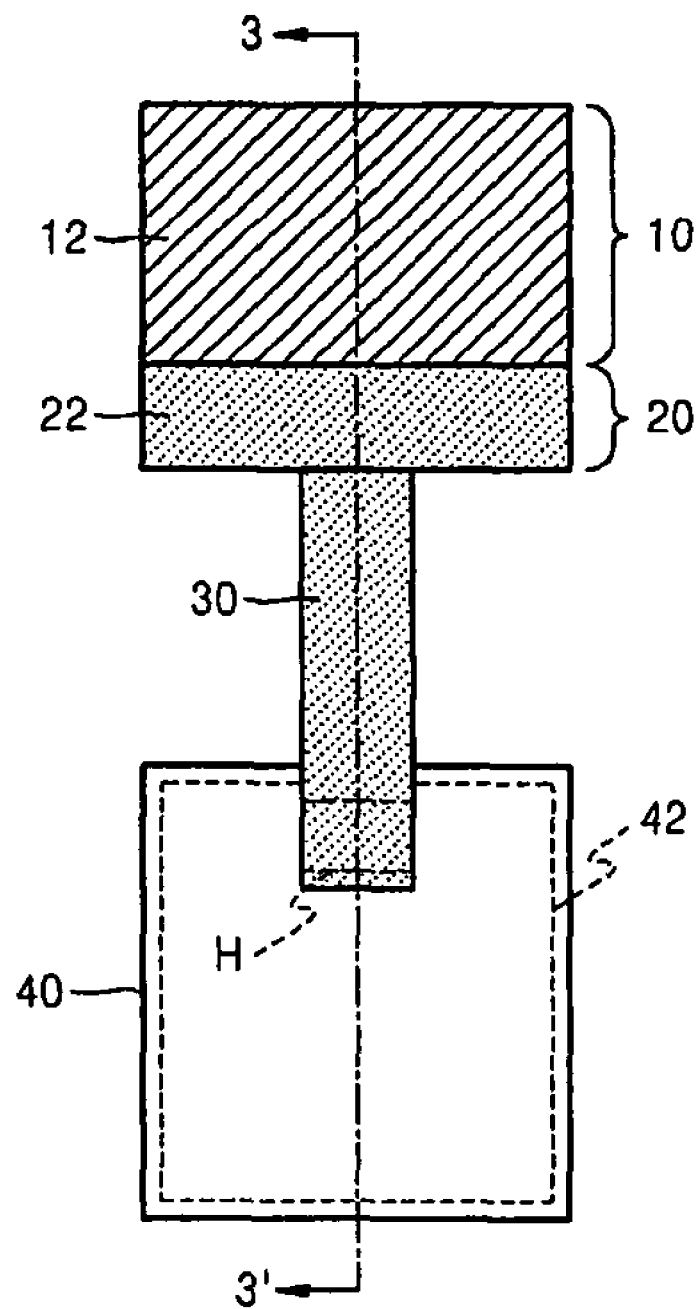
FIG. 1 is a front view of a fuel cell system in an operating mode according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A fuel cell system and a mobile communication device including the fuel cell system according to aspects of the present invention will now be described more fully with reference to the accompanying drawings, in which exemplary embodiments of the invention are shown. In the drawings, the thicknesses of layers and regions are exaggerated for clarity. As used herein, the terms "front," "rear," "upper," "lower," "under," etc., are used in their ordinary understood meanings to describe the fuel cell system and mobile communication device from the perspective of a user of the devices. For example, the front of a mobile communication device refers to the portion of the mobile communication device that would normally face the user when a user is looking at the device, entering data into the device or reading data from a display on the device.

The fuel cell system according to an embodiment of the present invention will be described as follows. Referring to FIG. 1, the fuel cell includes a cell pack 10 generating electricity, a fuel tank storing fuel, such as, for example, methanol, supplied to the cell pack 10, a fuel mixture unit 20, in which fuel supplied from the fuel tank 40 and water are mixed, and a fuel supplying path 30 that supplies the fuel from the fuel tank 40 to the fuel mixture unit 20. The fuel mixture unit 20 includes a first capillary unit 22, one end of which is connected to an anode layer 12 of the cell pack 10. The first capillary unit 22 may be a wick structure, such as, for example, a wick plate formed of thin film, or may be a porous medium. A first end of the fuel supplying path 30 is connected to the other end of the first capillary unit 22. The fuel supplying path 30 conveys the fuel from the fuel tank 40 to the fuel mixture unit 20 by capillary action. Therefore, the fuel supplying path 30 may also be a wick structure or a porous medium. Thus, the fuel supplying path 30 and the first capillary unit 22 may be a single wick plate. A fuel storage medium 42 stores fuel in the fuel tank 40.

Figure 2:
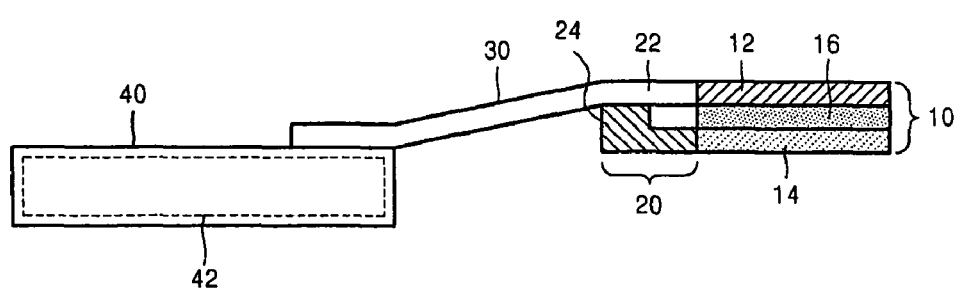
FIG. 2 is a side view of the fuel cell system of FIG. 1.

Referring to FIG. 2 illustrating a side portion of the fuel cell of FIG. 1, the fuel supplying path 30 may be inclined upward, that is, at an angle away from the fuel tank 40. The fuel mixture unit 20 includes the first capillary unit 22 and a second capillary unit 24 disposed under the first capillary unit 22. The second capillary unit 24 conveys water generated from a cathode layer 14 of the cell pack 10 to the first capillary unit 22. The second capillary unit 24 may be a wick structure, for example, a wick plate, or a porous medium like the first capillary unit 22. In FIG. 2, the second capillary unit 24 has a right-angle structure, however, other configurations are possible and the second capillary unit 24 can have a flexible structure. An interlayer 16 between the cathode layer 14 and the anode layer 12 of the cell pack 10 includes a catalyst layer and an electrolysis layer. The cell pack 10 may include a plurality of unit cells, each of which includes a cathode layer 14, an anode layer 12, and an interlayer 16. However, for convenience, only one unit cell is depicted in the drawings and described in detail herein.

Figure 3:
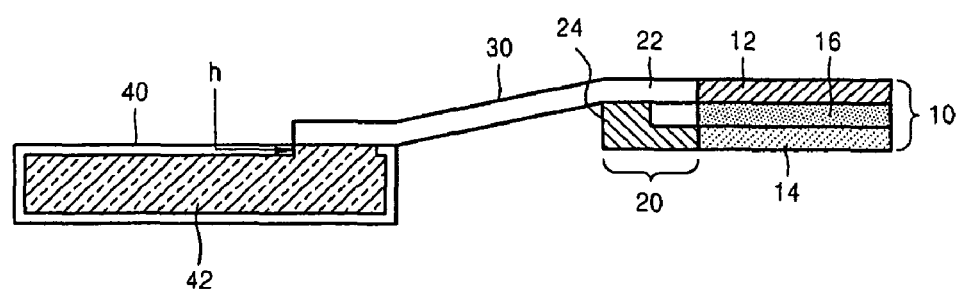
FIG. 3 is a cross-sectional view of the fuel cell system taken along line 3-3' of FIG. 1.

Referring to FIG. 3 illustrating a cross-section of the fuel cell taken along line 3-3' of FIG. 1, a part of the fuel storage medium 42 that is exposed through a hole h on the fuel tank 40 contacts a second end of the fuel supplying path 30. The fuel storage medium 42 may be a porous medium that stores the fuel, which can be, for example, methanol.

Figure 4:
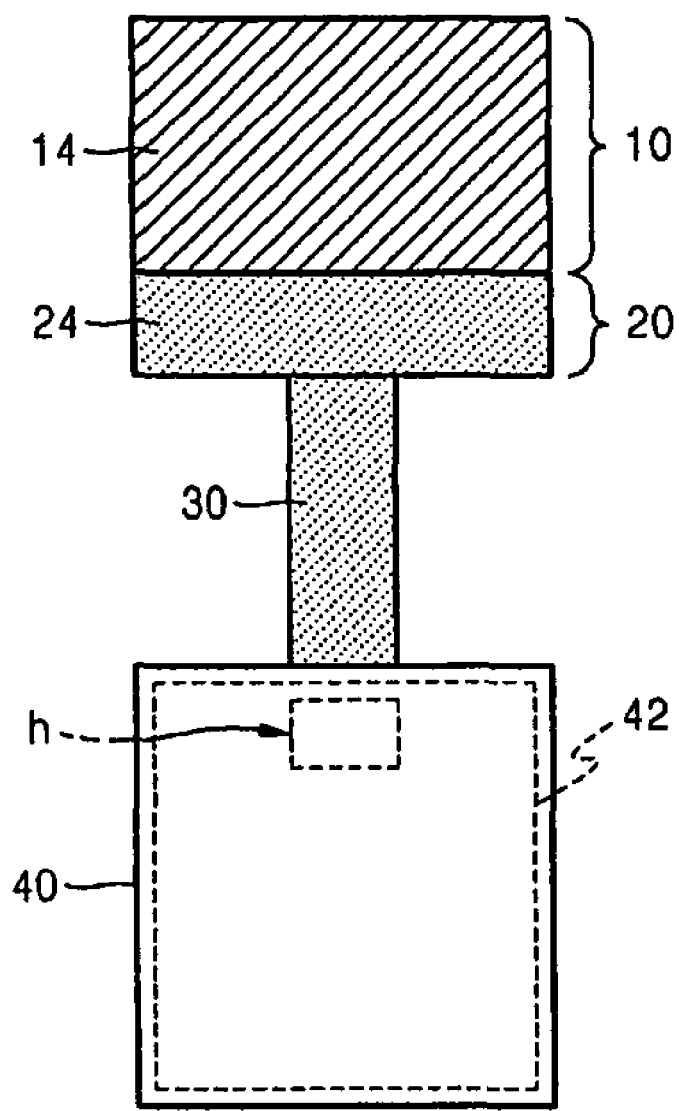
FIG. 4 is a rear view of the fuel cell system of FIG. 1.

FIG. 4 shows a rear surface of the fuel cell system of FIG. 1. In FIG. 1 and FIG. 4, the first and second capillary units 22 and 24 of the fuel mixture unit 20 are shown to have the same width. However, the first and second capillary units 22 and 24 can have different widths from each other.

Figure 5:
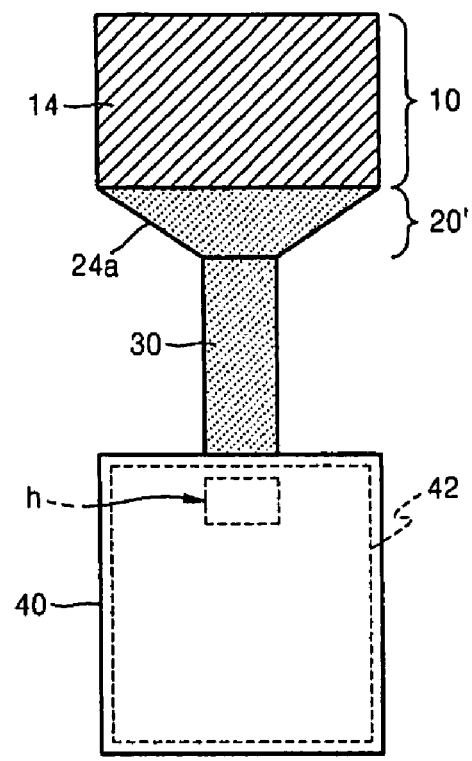
FIG. 5 is a rear view of a modified example of a second capillary unit shown in FIG. 4.

Although the widths of the first and second capillary units 22 and 24 are much greater than a width of the fuel supplying path 30, the widths of the first and second capillary units 22 and 24 may be reduced gradually in the direction of the fuel supplying path 30 so that the width of the portions of the first and second capillary units 22 and 24 that contact the fuel supplying path 30 can be the same as that of the fuel supplying path 30. FIG. 5 illustrates a fuel cell system including a fuel mixture unit 20' having different widths at the portion that contacts the cell pack 10 and the portion that contacts the fuel supplying path 30. A modified second capillary unit 24a has the same width as the fuel mixture unit 20 at the point where the modified second capillary 24a contacts the fuel mixture unit 20. Although it is not shown in FIG. 5, the first capillary unit 22 connecting to the fuel supplying path 30 can also have the modified structure having the same width as that of the fuel mixture unit 20 at the point where the first capillary unit 22 contacts the fuel mixture unit 20.

Figure 6:
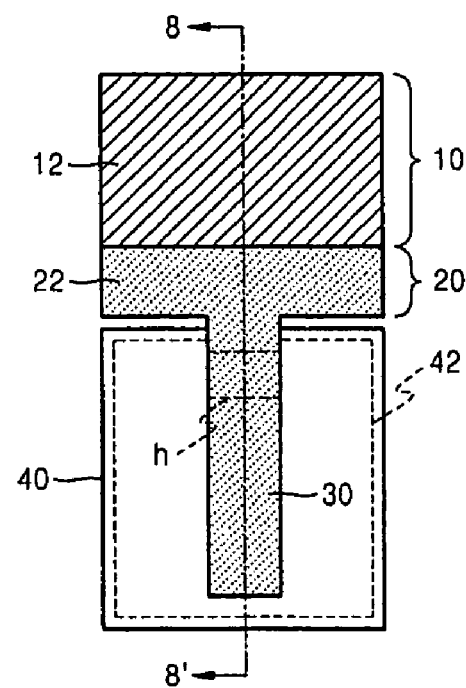
FIG. 6 is a front view of the fuel cell system of FIG. 1 in a standby mode.

FIG. 6 illustrates a front view of the fuel cell system of FIG. 1 in a standby mode. When the fuel cell system is in the standby mode, the cell pack 10, the fuel mixture unit 20, and the fuel supplying path 30 are pulled in the direction of the fuel tank 40 so that the distance between the fuel mixture unit 20 and the fuel tank 40 is reduced as shown in FIG. 6. Thus, a second end of the fuel supplying path 30 is much closer to the lower end of the fuel tank 40 (that is, an end of the fuel tank away from the cell pack) than it is in the operating mode of the fuel cell system.

Figure 7:
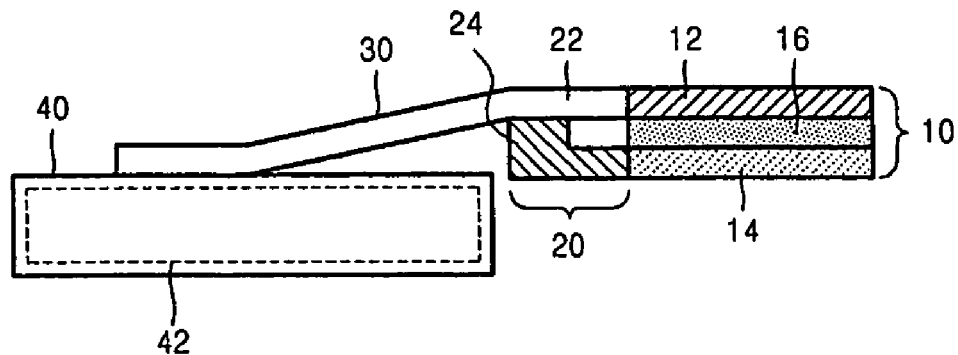
FIG. 7 is a side view of the fuel cell system of FIG. 6.
Figure 8:
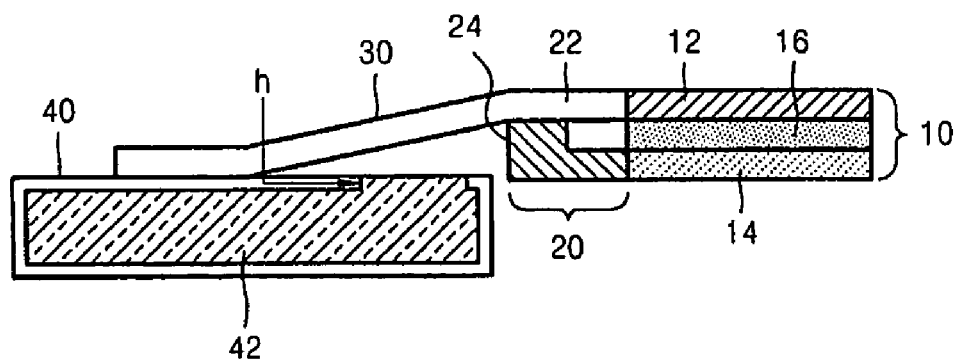
FIG. 8 is a cross-sectional view of the fuel cell taken along line 8-8' of FIG. 6.

FIG. 7 is a side view of the fuel cell system of FIG. 6, and FIG. 8 is a cross-sectional view of the fuel cell system taken along line 8-8' of FIG. 6. Referring to FIG. 8, the fuel supplying path 30 is moved along the surface of the fuel tank 40, so that the second end of the fuel supplying path 30 no longer contacts the hole h of the fuel tank 40. Since the fuel supplying path 30 inclines at an angle away from the fuel tank, the fuel supplying path 30 and the hole h are separated from each other when the second end is moved away from the hole h and the fuel is not supplied to the fuel supplying path 30 anymore.

Figure 9:
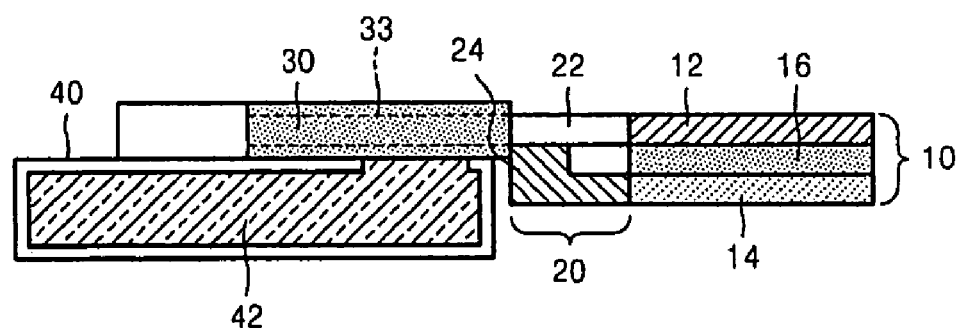
FIG. 9 is a cross-sectional view of the fuel cell system of FIG. 1, in which a fuel supplying path is covered by a shielding layer.

As an alternative to the configuration described with respect to FIGS. 7 and 8, the fuel supplying path 30 except for the portion contacting the fuel storage medium 42 may be covered by a shielding layer 33 as shown in FIG. 9. In this embodiment, it is not necessary for the fuel supplying path 30 to incline away from the fuel tank 40. Instead, the fuel supplying path 30 may extend in a horizontal direction. In the standby mode, the shielding layer 33 prevents the fuel supplying path 30 from contacting the fuel storage medium 42.

Figure 10:
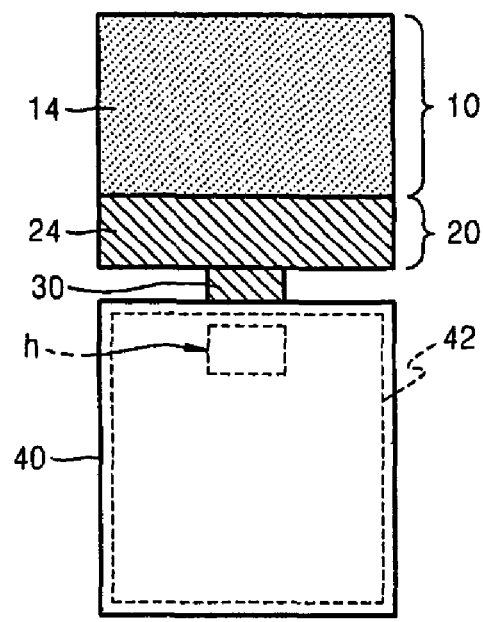
FIG. 10 is a rear view of the fuel cell system of FIG. 6.

FIG. 10 illustrates a rear of the fuel cell system in the standby mode of FIG. 6.

Figure 11:
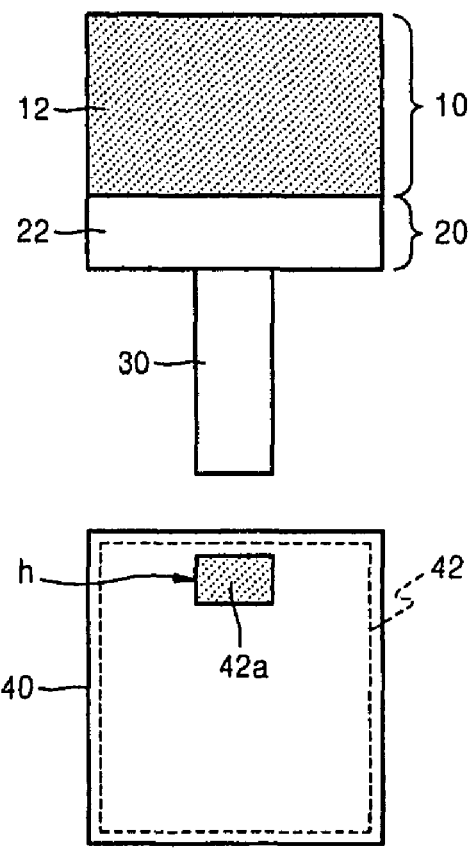
FIG. 11 is a front view of a fuel tank and other components separated from one another in the fuel cell system of FIG. 1.

FIG. 11 illustrates the fuel supplying path 30 and the fuel tank separated from each other in the fuel cell system of FIG. 1.

Referring to FIG. 11, the hole h formed in the fuel tank 40 can be seen more clearly. Reference numeral 42a denotes a part of the fuel storage medium 42 in the fuel tank 40 that is exposed through the hole h. When the fuel cell system is in the operating mode, the part 42a of the fuel storage medium 42 that is exposed through the hole h contacts the fuel supplying path 30.

The fuel tank 40 may be filled completely with the fuel storage medium 42 as shown in FIGS. 8 and 9, or may be not filled completely. FIGS. 12 through 16 show examples of the fuel storage medium 42.

Figure 12:
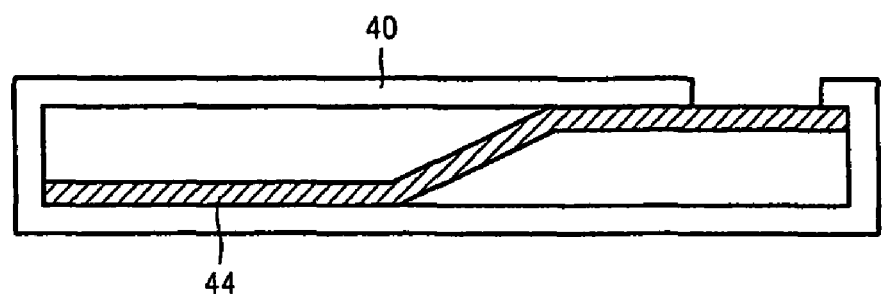
FIGS. 12 through 15 are cross-sectional views of modified examples of the fuel tank in the fuel cell system of FIG. 1.

Referring to FIG. 12, the fuel storage medium 42 can be in the form of a porous medium 44 having a predetermined thickness. The porous medium 44 is bent at a center portion thereof, and one end of the porous medium 44 contacts the bottom of the fuel tank 40 and the other end contacts the ceiling of the fuel tank 40 and also covers the hole h formed in the fuel tank 40. The thickness of the porous medium 44 is thinner than that of the fuel storage medium 42.

Figure 13:
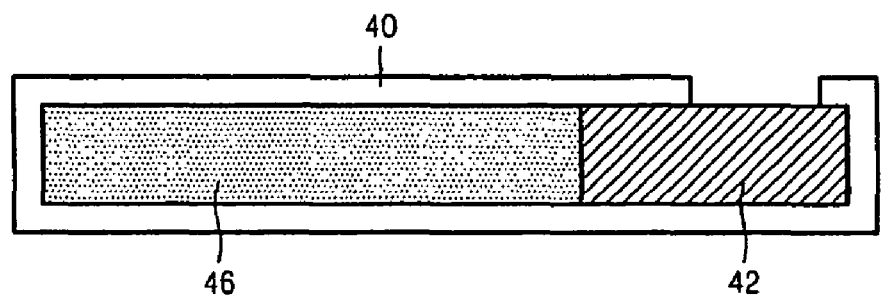

Referring to FIG. 13, the fuel storage medium 42 can occupy only a part of the fuel tank 40, and the other part of the fuel tank 40 may be filled by fuel 46, such as, for example, methanol. The fuel storage medium 42 can occupy the space where the hole h of the fuel tank 40 is formed. The fuel 46 is induced into the fuel storage medium 42.

Figure 14:
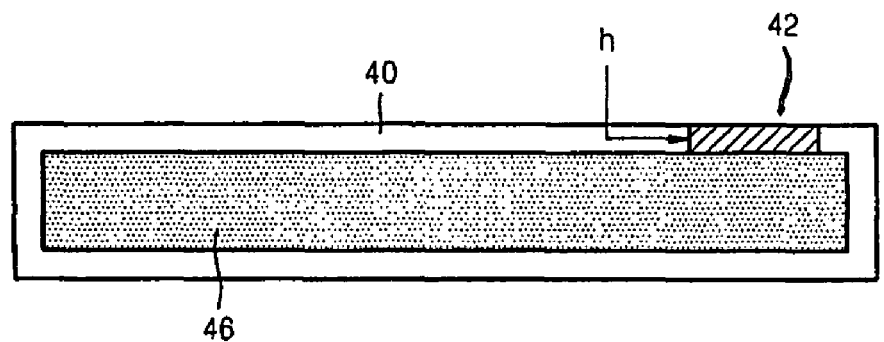

In addition, referring to FIG. 14, the fuel 46 can fill the entire space in the fuel tank 40 and the fuel storage medium 42 can be formed only at the location of the hole h. In the embodiment depicted in FIG. 14, the fuel storage medium 42 acts as a channel through which the fuel 46 passes.

Figure 15:
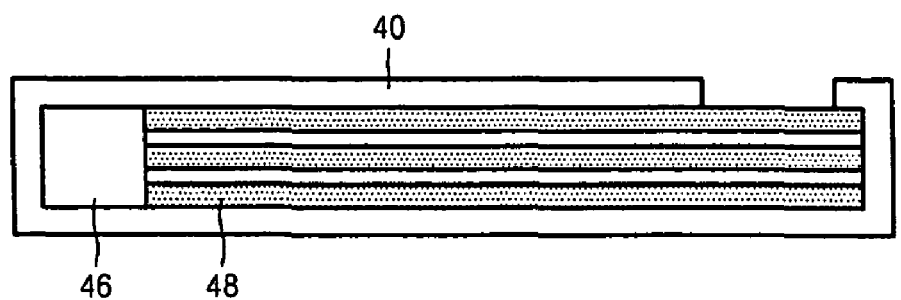

Referring to FIG. 15, the fuel storage medium 42 can be in the form of a structure in which a plurality of wick plates 48 are stacked, occupying most of the fuel tank 40. The space in the fuel tank 40 that is not occupied by the wick plates 48 is filled by the fuel 46. Portions of the plurality of wick plates 48 contacting the fuel 46 are separated from each other, however, opposite portions of the plural wick plates 48 are connected to each other. In FIG. 15, three wick plates 48 are stacked in the fuel tank 40, however, there may be more wick plates 48 or fewer wick plates 48 in the fuel tank 40.

Figure 16:
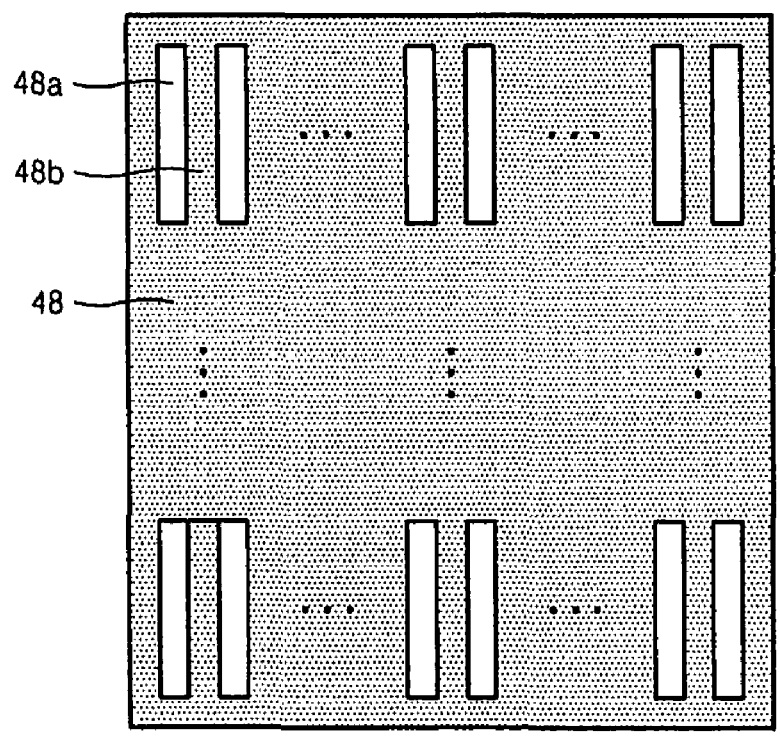
FIG. 16 is a plan view of a wick plate included in the fuel tank of FIG. 15.

FIG. 16 illustrates an example of the wick plate 48. Referring to FIG. 16, a plurality of long holes 48a are formed in the wick plate 48. In addition, planar wicks 48b exist between the holes 48a, and a capillary force is applied under the planar wicks 48b. Therefore, the fuel 46 can flow under the planar wicks 48b.

Next, a mobile communication device including the fuel cell system described above will be described.

Figure 17:
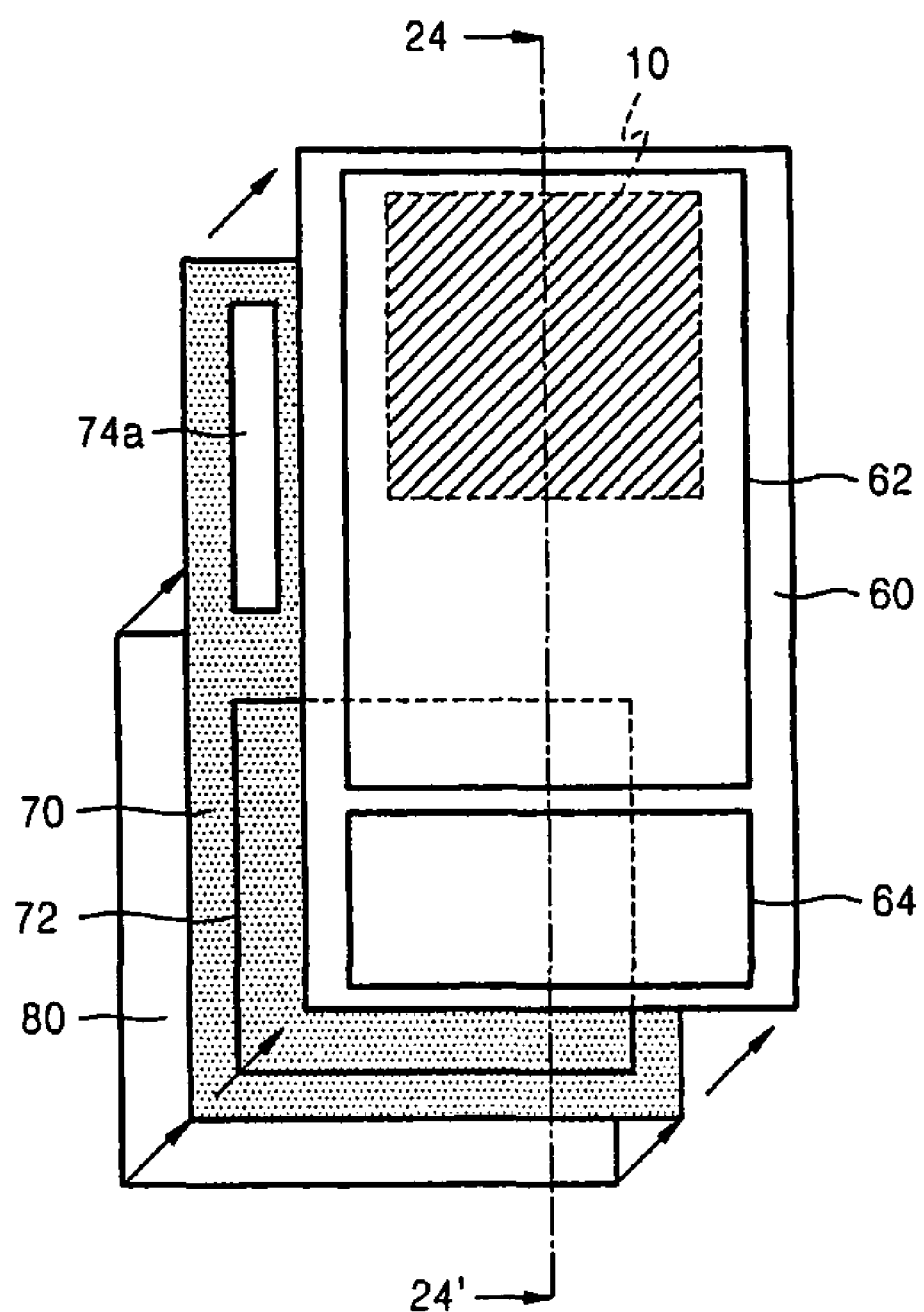
FIG. 17 is a perspective view of a mobile communication device including the fuel cell system of FIG. 1, according to an embodiment of the present invention.

FIG. 17 illustrates an example of the mobile communication device (hereinafter, a communication device) according to an embodiment of the present invention. In the present embodiment, the communication device is a sliding-type mobile phone.

Referring to FIG. 17, the communication device of the present invention includes an upper panel 60, a lower panel 70, and a power unit 80 including a fuel tank. The cell pack 10 is included in the upper panel 60. The upper panel 60 includes a screen region 62 displaying letters, images, and moving pictures on a front portion thereof, and a first button region 64 under the screen region 62. The first button region 64 includes keys used to identify or search information displayed on the screen region 62 when the communication device is in a standby mode. A second button region 72 is disposed on front lower portion of the lower panel 70. In addition, guide rails 74a and 74b (refer to FIG. 19) that guide the upper panel 60 is disposed on the front upper portion of the lower panel 70. The second button region 72 of the lower panel 70 includes main keys that are used when the communication device is in an operating mode.

Figure 18:
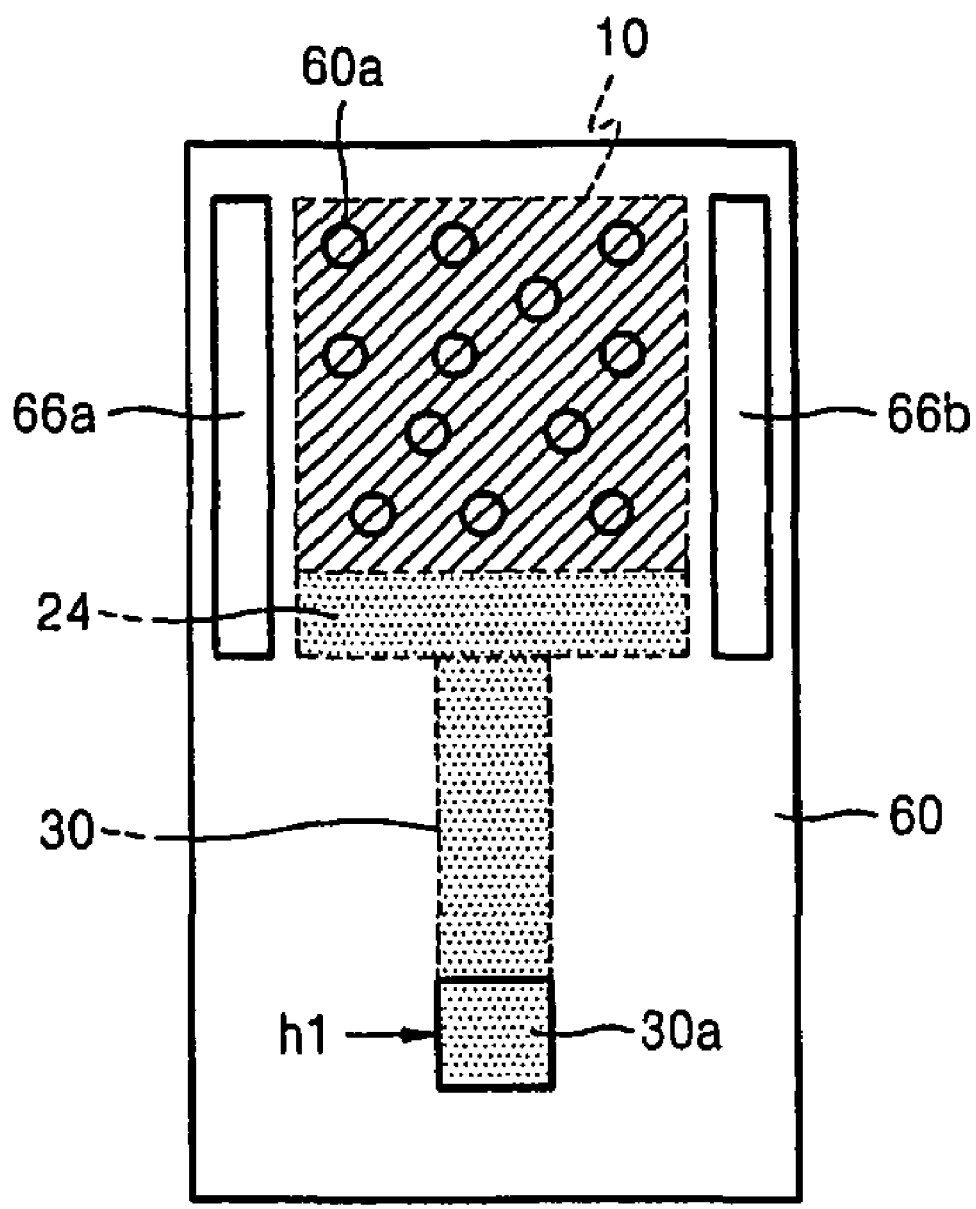
FIG. 18 is a back view of an upper panel in the mobile communication device of FIG. 17.

FIG. 18 shows a rear surface of the upper panel 60, that is, the surface facing the front surface of the lower panel 70.

Referring to FIG. 18, two guide rails 66a and 66b are placed at a predetermined distance from each other on the rear surface of the upper panel 60. The guide rails 66a and 66b contact the guide rails 74a and 74b (refer to FIG. 19) formed on the front surface of the lower panel 70. The cell pack 10 is built in the upper panel 60 between the guide rails 66a and 66b. One or more penetration holes 60a exposing the cell pack 10 are formed in the rear surface of the upper panel 60 between the guide rails 66a and 66b. The penetration hole 60a serves as an air inlet and a gas and heat outlet, for dissipating heat generated by the cell pack 10 during operation of the communication device. The upper panel 60 also includes the second capillary unit 24 connected to the lower end of the cell pack 10 and the fuel supplying path 30 connected at a first end portion to the lower end of the second capillary unit 24. A second end portion 30a of the fuel supplying path 30 is exposed through a hole h1 formed in the rear surface of the upper panel 60. The hole h1 is formed between the fuel supplying path 30 and the rear surface of the upper panel 60. The exposed second end portion 30a of the fuel supplying path 30 contacts the fuel storage medium in the fuel tank of the power unit 80 when the communication device is in the operating mode. The cell pack 10, the second capillary unit 24, and the fuel supplying path 30 may be the same as those in the fuel cell system described above.

Figure 19:
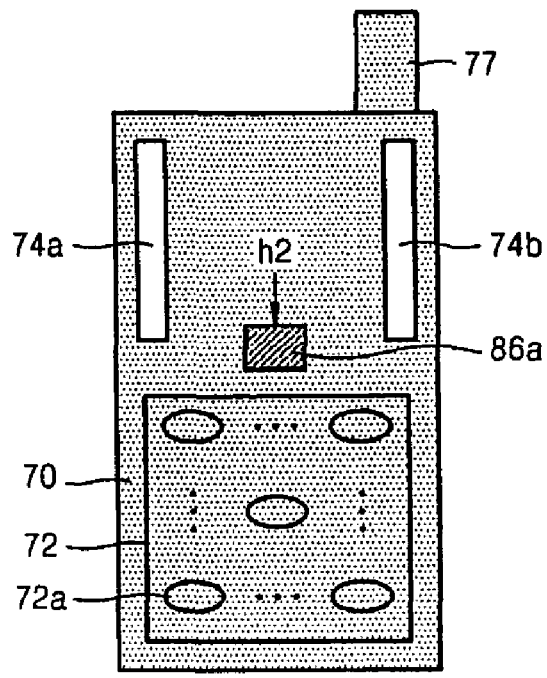
FIG. 19 is a front view of a lower panel in the mobile communication device of FIG. 17.

FIG. 19 illustrates the front surface of the lower panel 70 having the power unit 80 attached at the rear surface thereof. Referring to FIG. 19, a plurality of main keys 72a are disposed in the second button region 72. In addition, two guide rails 74a and 74b corresponding to the guide rails 66a and 66b of the upper panel 60 are formed. A hole h2 is formed above the second button region 72. A portion exposed by the hole h2 is a part of the fuel storage medium included in the power unit 80, which will be described later. Reference numeral 77 denotes an antenna, which can be built in the communication device.

Figure 20:
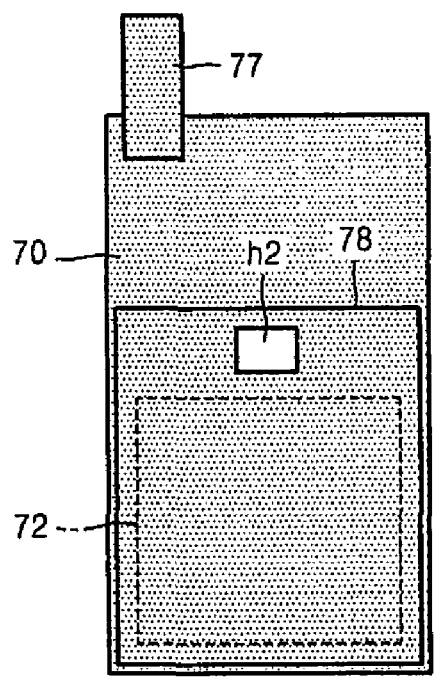
FIG. 20 is a back view of the lower panel in the mobile communication device of FIG. 17.

FIG. 20 illustrates the rear surface of the lower panel 70 without the power unit 80. Referring to FIG. 20, the hole h2 extends through the lower panel 70 such that when the power unit 80 is installed, a part of the fuel storage medium included in the power unit 80 is exposed to the hole h2. Reference numeral 78 denotes an area to which the power unit 80 is attached.

Figure 21:
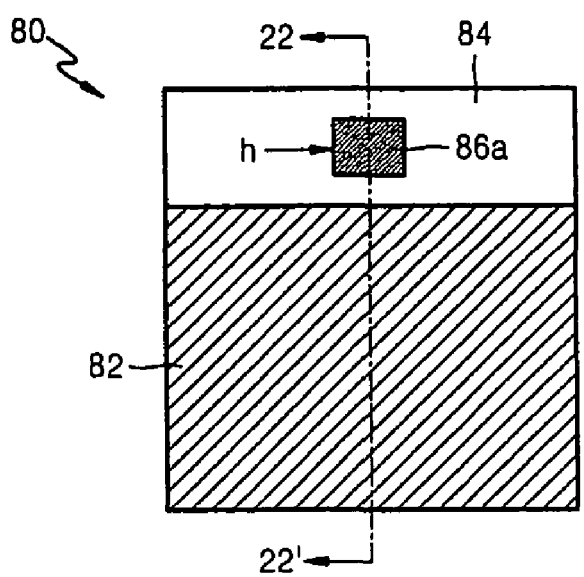
FIG. 21 is a front view of a fuel tank in the mobile communication device of FIG. 17.

FIG. 21 illustrates a front surface of the power unit 80, that is, the surface that attaches to the lower panel 70. Referring to FIG. 21, the power unit 80 includes a battery 82, which is, for example, a secondary battery, and a fuel tank 84. A hole h is formed in the fuel tank 84 and above the battery 82. The hole h formed in the fuel tank 84 exactly matches or aligns with the hole h2 formed in the lower panel 70 when the power unit 80 is attached to the lower panel 70. The battery 82 is the power source used when the communication device is in the standby mode. The fuel cell system including the cell pack 10 and the fuel tank 84 can be used to support the battery 82 when the communication device requires a lot of power, such as, for example, when a user of the communication device uses a telephone feature of the communication device. Alternatively, the fuel cell system can be the exclusive source of power when the communication device is in the operating mode.

Figure 22:
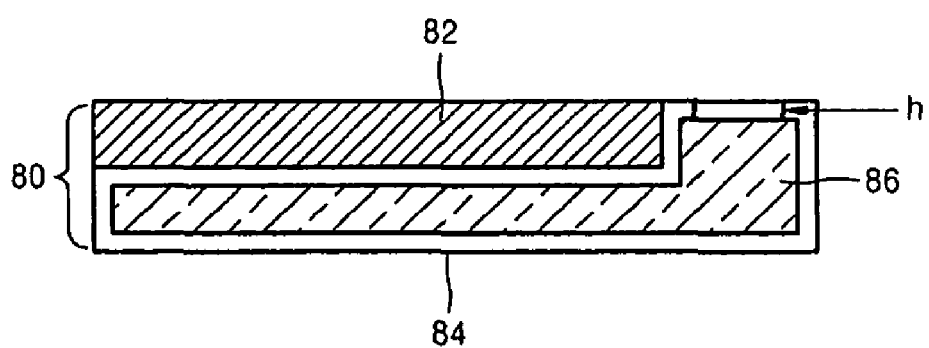
FIG. 22 is a cross-sectional view of the fuel tank taken along line 22-22' of FIG. 21.

FIG. 22 is a cross-sectional view of the power unit 80 of FIG. 21 taken along line 22-22'. Referring to FIG. 22, the power unit 80 is formed by stacking the fuel tank 84 and the battery 82. That is, the portion of the fuel tank 84 where the hole h is formed protrudes upward, and the other portion is plane. In addition, the battery 82 is formed on the plane portion of the fuel tank 84.

Figure 23:
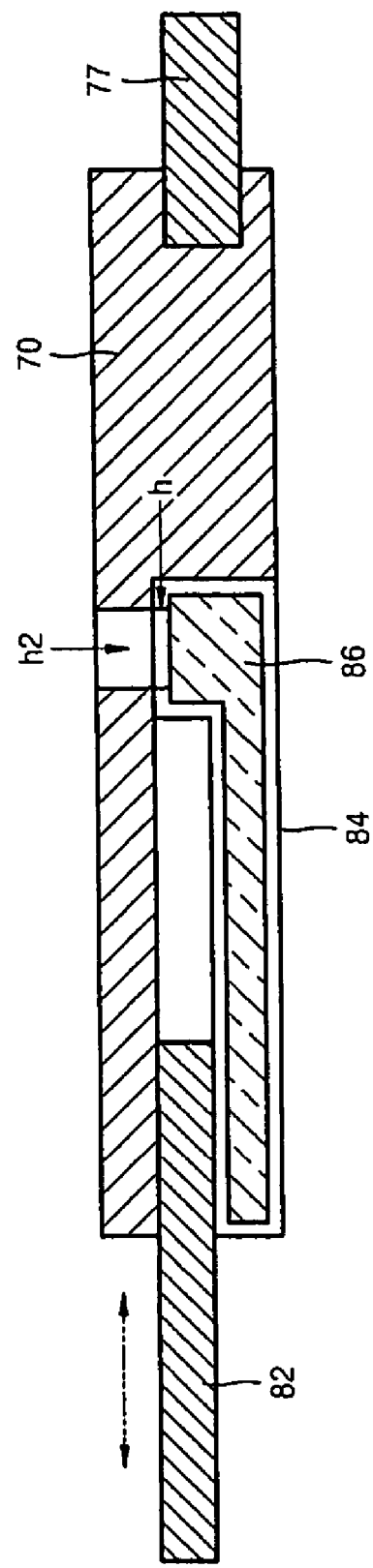
FIG. 23 is a cross-sectional view of the mobile communication device of FIG. 17 when a battery is inserted between the lower panel and the fuel tank fixed onto the lower panel.

Meanwhile, if the fuel tank 84 is re-chargeable, the fuel tank 84 of the power unit 80 can be permanently fixed with the lower panel 70, and the battery 82 can be inserted between the lower panel 70 and the fuel tank 84. FIG. 23 shows the re-chargeable fuel tank 84 and the battery 82 inserted between the lower panel 70 and the fuel tank 84. Further, if the battery 82 is re-chargable, the battery 82 can be inserted and removed between the lower panel 70 and the fuel tank 84 as shown. Alternatively, the battery 82 can be integrally fixed with the lower panel 70, and the fuel tank 84 can be detachable.

Figure 24:
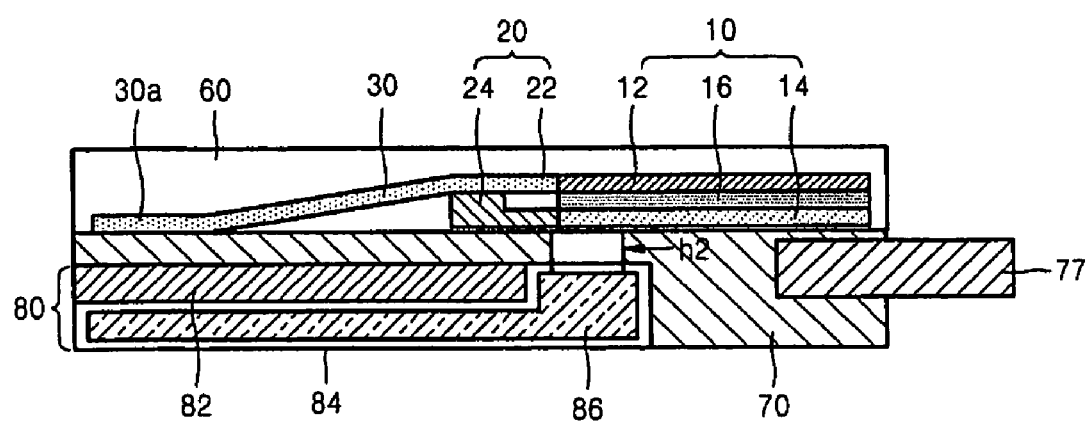
FIG. 24 is a cross-sectional view of the mobile communication device taken along line 24-24' of FIG. 17.

FIG. 24 is a cross-sectional view of the communication device of FIG. 17 taken along line 24-24'. Referring to FIG. 24, all elements of the fuel cell system except for the fuel tank 84 are built in the upper panel 60. In other words, the cell pack 10, the fuel mixture unit 20, and the fuel supplying path 30 are all built in the upper panel 60. In addition, the exposed second end portion 30a of the fuel supplying path 30 contacts the lower panel 70. FIG. 24 illustrates the communication device in the standby mode. A cross-section of the communication device in the operating mode can be shown in FIG. 25.

Referring to FIG. 25, when the communication device is in the operating mode, the exposed second end portion 30a of the fuel supplying path 30 contacts and covers the hole h2 formed on the lower panel 70. Therefore, the fuel stored in the fuel storage medium 86 of the fuel tank 84 can be supplied to the fuel supplying path 30 through the hole h2. In FIG. 25, the fuel storage medium 86 and the exposed second end 30a of the fuel supplying path 30 are separated from each other due to the depth of the hole h2, however, the lower panel 70 is thin, and the depth of the hole h2 is much smaller than the diameter thereof. (As stated above, thicknesses of layers are exaggerated in the drawings for clarity.) Therefore, the fuel storage medium 86 can be reliably contacted to the second end portion 30a of the fuel supplying path 30 so that the fuel tank 84 is in fluid communication with the fuel supplying path 30.

Figure 28:
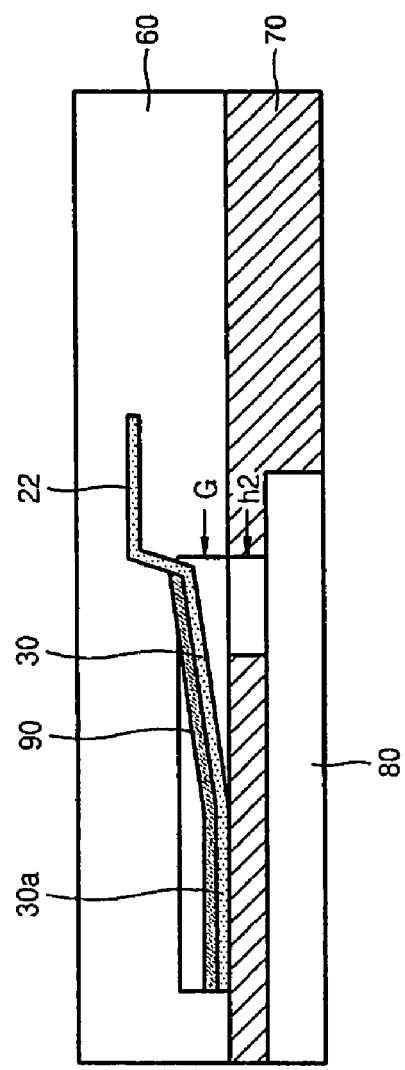

The communication device of the present invention can be modified in various ways, and such examples are shown in FIGS. 26 and 28.

Figure 27:
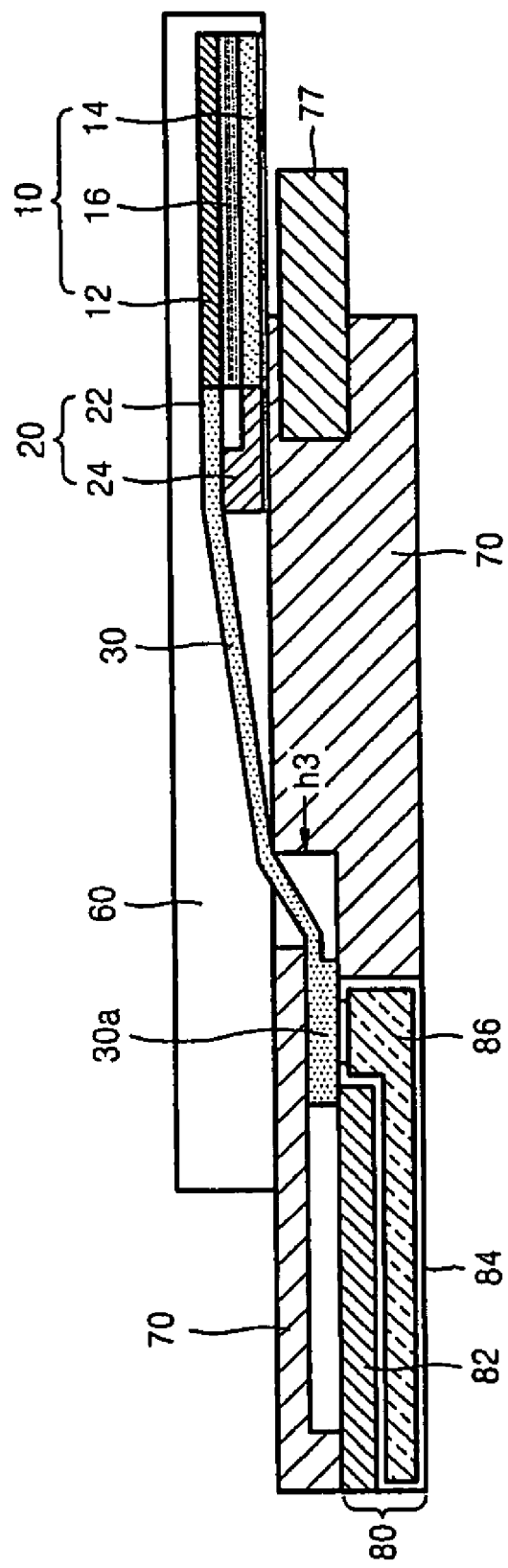

Referring to FIG. 26, a hole h3 is formed in the lower panel 70. The hole h3 is expanded toward the region where the power unit 80 of the lower panel 70 is attached. The fuel supplying path 30 extends to the rear surface of the lower panel 70, that is, to the surface to which the power unit 80 is attached, through the hole h3. The second end portion 30a of the fuel supplying path 30 can be thicker than any other portion of the fuel supplying path 30. Then, the fuel supplying path 30 does not contact the fuel storage medium 86 in the fuel tank 84 when the communication device is in the standby mode as shown in FIG. 26, and the fuel supplying path 30 can only contact the fuel storage medium 86 along the hole h3 when the communication device is in the operating mode as shown in FIG. 27. If the fuel supplying path 30 is covered by a shielding material except for the second end portion 30a contacting the fuel storage medium 86, similar to the shielding layer 33 depicted in FIG. 9, the second end portion 30a of the fuel supplying path 30 contacting the fuel storage medium 86 does not need to be formed to be thicker than the other portions of the fuel supplying path 30.

FIG. 28 illustrates the communication device in which the fuel supplying path 30 is disposed between the upper panel 60 and the lower panel 70. In FIG. 28, the elements already illustrated in FIG. 27 are omitted.

Referring to FIG. 28, a groove G of a predetermined depth is formed in the rear surface of the upper panel 60. The length of the groove G corresponds to the length of the fuel supplying path 30. Consequently, the entire fuel supplying path 30 including the second end 30a contacting the fuel storage medium 86 exists between the upper panel 60 and the lower panel 70. The portion except for the second end portion 30a contacting the fuel storage medium 86, that is, an intermediate portion between the second end 30a and the first end, which contacts the first capillary unit 22 of the fuel mixture unit 20, is inclined upward. In an embodiment where the fuel supplying path 30 is a wick plate, the wick plate can be inclined. However, if the fuel supplying path 30 is made of a flexible porous material, the fuel supplying path 30 can be fixed onto a frame 90 having the same shape as that of the fuel supplying path 30 and having elasticity to some degree in order to maintain the inclined shape and make the connection of the second end portion 30a to the fuel storage medium 86 firm. An end of the frame 90 is fixed on the rear surface of the upper panel 60. Since the fuel supplying path 30 is inclined upward, the fuel supplying path 30 does not contact the fuel storage medium 86 in the standby mode.

Figure 29:
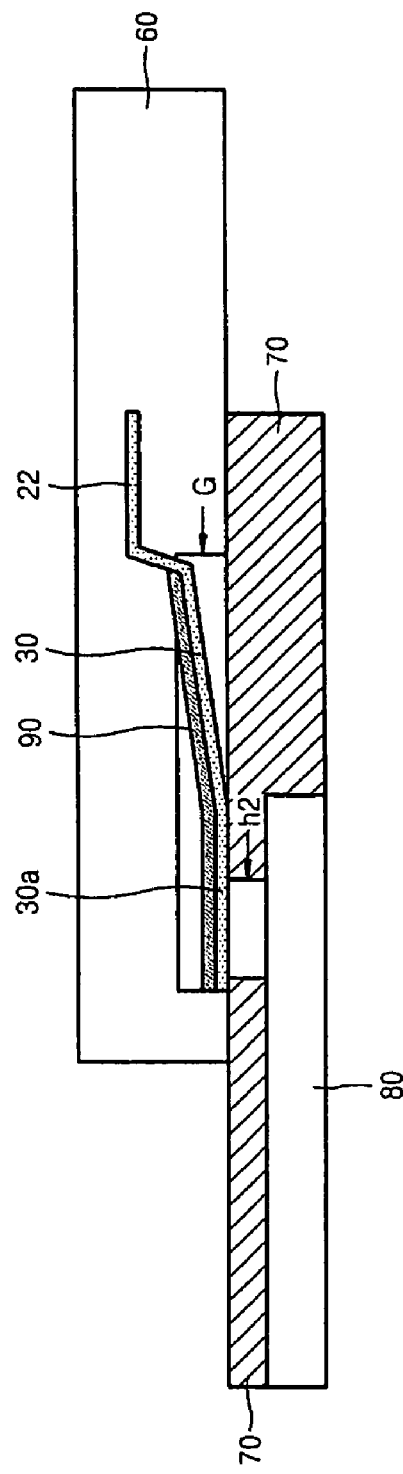

FIG. 29 illustrates positions of the upper and lower panels 60 and 70 when the communication device is in the operating mode. Referring to FIG. 29, the second end portion 30a of the fuel supplying path 30 covers the hole h2 formed in the lower panel 70.

Referring to FIG. 30, a space S can be formed between the second end portion 30a of the fuel supplying path 30 and the second button region 72 of the lower panel 70 in the communication device of FIG. 28. To do this, a surface of the second button region 72 can be formed to be in a lower position than that of a peripheral portion. In other words, the second button region 72 can be recessed in the lower panel 70. As shown in FIG. 28, although there is no space S between the second button region 72 and the second end portion 30a of the fuel supplying path 30 in the embodiment of FIG. 28, there is not much possibility of contaminating the second button region 72. However, if the space S exists between the second button region 72 and the second end portion 30a of the fuel supplying path 30, the contamination of the second button region 72 can be completely prevented.

FIG. 31 illustrates the positions of the upper and lower panels 60 and 70 when the communication device having the space S between the second button region 72 and the second end portion 30a of the fuel supplying path 30 is in the operating mode.

During the development of embodiments the fuel cell system according to aspects of the present invention, there was concern that fuel could disperse toward cathode layer 14 through the second capillary unit 24 when fuel that is supplied through the fuel supplying path 30 and water that is supplied through the second capillary unit 24 connected to the cathode layer 14 are mixed in the fuel mixture unit 20. However, experiments in this regard did not show this. In these experiments, a fabric was used to represent the fuel supplying path, and pure methanol and water were used as test fluids. The pure methanol and water were mixed in the mixture unit and dispersed in the same directions and did not disperse to the supplying direction of the methanol or to the supplying direction of the water. In addition, a mixture rate of the pure methanol and the water was controlled in the mixture unit by controlling the widths of the paths through which the pure methanol and the water were supplied. In these experiments, the path through which the pure methanol was supplied corresponds to the fuel supplying path 30 of the fuel cell system or the communication device according to aspects of the present invention, and the path through which the water was supplied corresponds to the second capillary unit 24. Therefore, according to the experimental results, the fuel and water can be mixed at the desired mixture rate by controlling the widths of the fuel supplying path 30 and the second capillary unit 24 and there would be no problem of the fuel dispersing toward the cathode layer 14.

Figure 32:
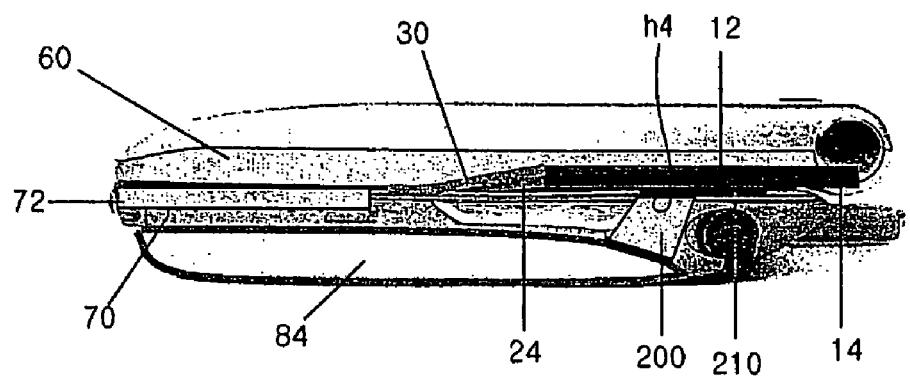
FIGS. 32 and 33 are views of a sliding type cellular phone that includes a fuel cell system according to an embodiment of the present invention.
Figure 33:
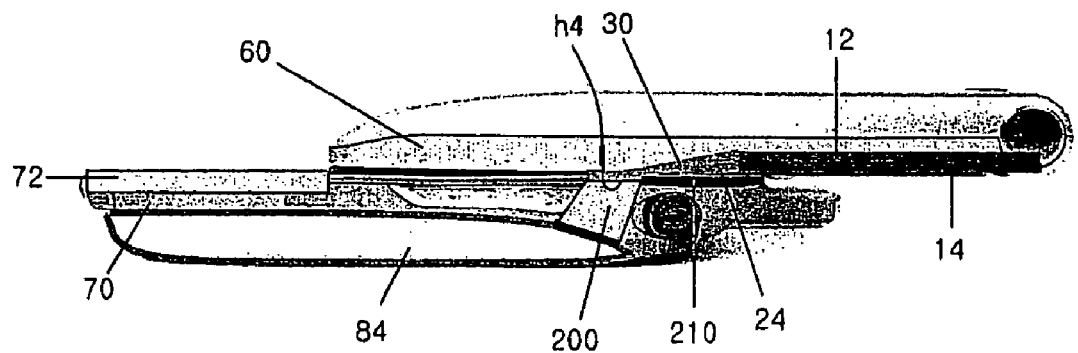

FIGS. 32 and 33 are views of a sliding type mobile phone using the fuel cell system according to an aspect of the present invention. A diagram of the fuel cell system included in the mobile phone is overlapped on the views of the mobile phone.

FIG. 32 shows the sliding type mobile phone in the standby mode, that is, when the upper panel 60 is not slid up. In addition, FIG. 33 shows the sliding type mobile phone in the operating mode, that is, when the upper panel 60 is slid up.

Reference numeral 200 in FIGS. 32 and 33 denotes a transfer medium for transferring the fuel from the fuel tank 84 to the fuel supplying path 30. The transfer medium 200 may be a porous material having a capillary force or a wick structure. The transfer medium 200 may be formed by expanding the fuel storage medium 42 or 86 included in the fuel tank 84.

Reference numeral 210 in FIGS. 32 and 33 denotes a shutter of a fuel inlet.

Referring to FIG. 32, when the sliding type mobile phone is in the standby mode, a hole h4, which is filled with the transfer medium 200, is covered by the fuel inlet shutter 210. However, when the sliding type mobile phone is being used in the operating mode, that is, when the upper panel 60 is slid up, the fuel inlet shutter 210 is moved with the upper panel 60 to expose the hole h4 as shown in FIG. 33, and thus, the fuel supplying path 30 can contact the transfer medium 200 that fills the hole h4.

Figure 34:
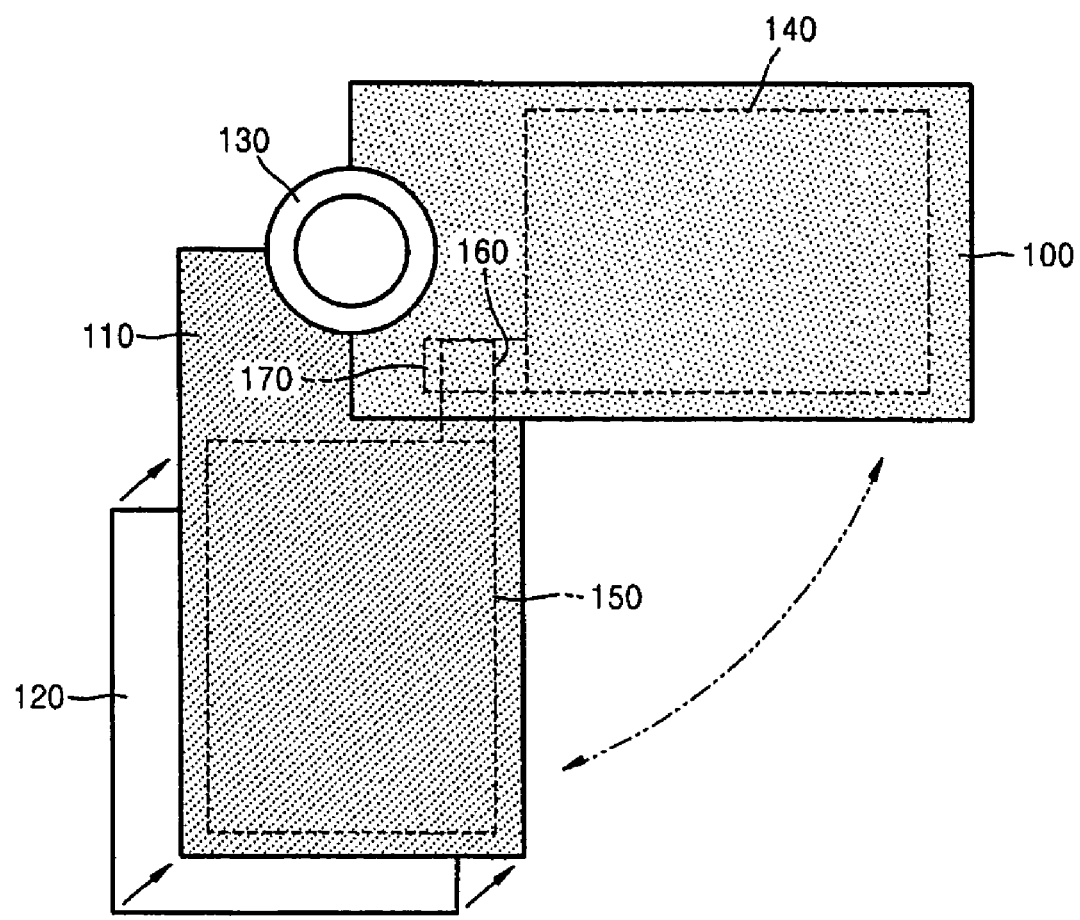

FIG. 34 illustrates a swing type mobile phone, for example, a swing type cellular phone or a digital multi broadcasting (DMB) phone, in which one of an upper panel 100 and a lower panel 110 rotates. That is, the upper panel 100 and lower panel 110 rotate relative to each other.

Referring to FIG. 34, the upper panel 100 and the lower panel 110 rotate by predetermined angles via a rotary shaft 130. A cell pack 150 is placed in the lower panel 110, and a battery 120 is mounted on a rear surface of the lower panel 110. The lower panel 110 also includes a fuel mixture unit 160 connected to the cell pack 150. A part of the fuel mixture unit 160 is exposed. The fuel mixture unit 160 can have the same structure as that of the above fuel mixture unit 20. A fuel tank 140 can be built into the upper panel 100, or can be mounted on a bottom surface of the upper panel 100 just as the battery 120 is mounted on the rear surface of the lower panel 110, so as to provide accessibility for replacing or re-charging the fuel. A part of a fuel supplying path 170 is exposed to contact the exposed portion of the fuel mixture unit 160 on the lower panel 110 when the communication device of FIG. 34 is in the operating mode, that is, the upper and lower panels 110 and 110 are opened at the predetermined angles.

Figure 35:
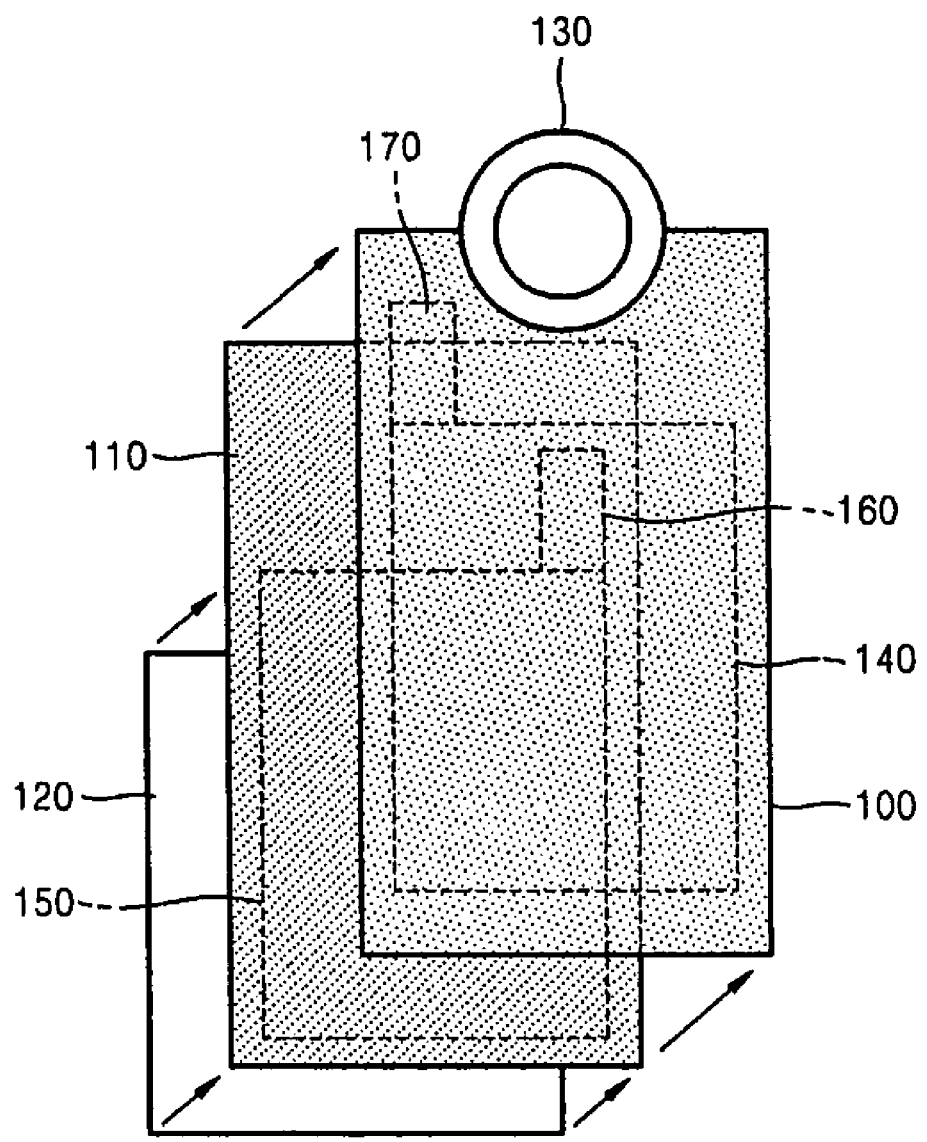

Referring to FIG. 35, the fuel supplying unit 170 and the fuel mixture unit 160 are separated from each other when the communication device is in the standby mode, that is, when the upper and lower panels 100 and 110 are rotated to their original closed position. The cell pack 150 and the fuel tank 140 may be formed so that they are opposite to each other in the communication device of FIG. 35 in the closed position.

Meanwhile, if the amount of fuel supplied when the communication device is in the standby mode and in the operating mode can be controlled, the communication device of the present invention can operate only with the fuel cell system without using the secondary battery. In addition, the fuel cell system can be used in other types of communication devices, such as, for example, foldable-type cellular phones.

Figure 36:
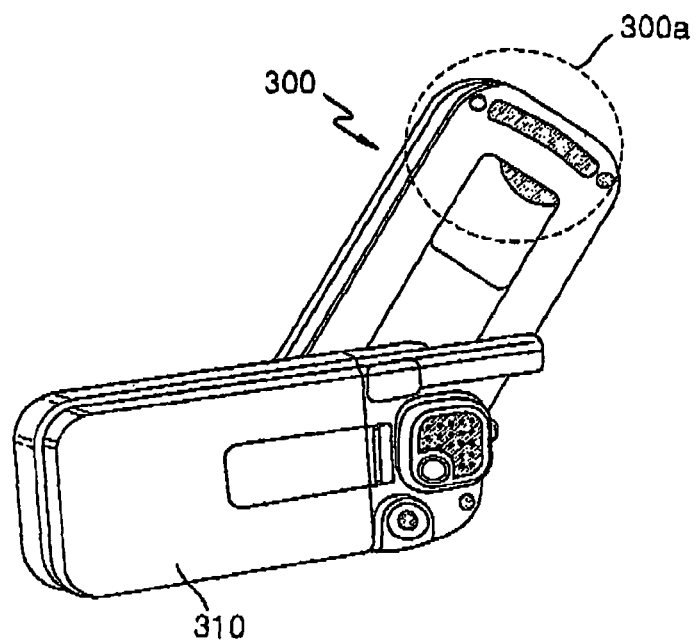
FIGS. 36 and 37 are views of a swing type cellular phone that includes the fuel cell system of FIG. 1.
Figure 37:
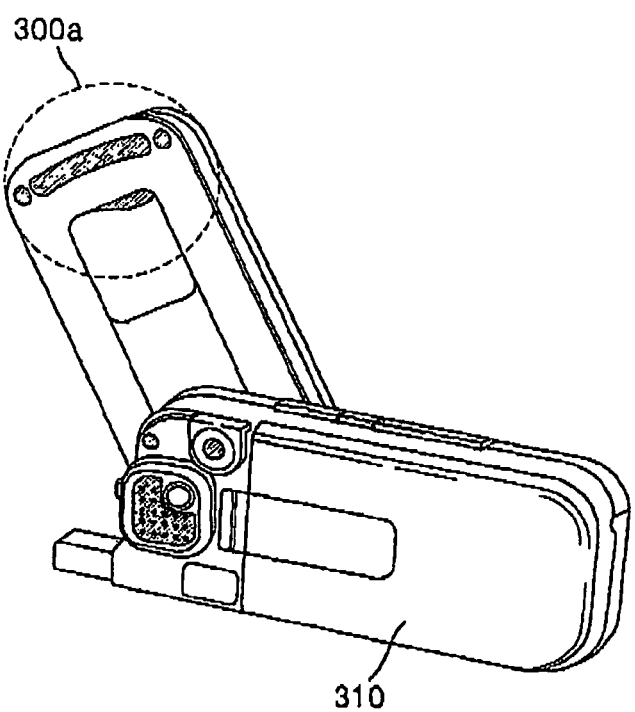

FIGS. 36 and 37 are a view of a swing-type cellular phone using the fuel cell system according to an aspect of the present invention.

In the swing type cellular phone of FIG. 36, the cell pack of the fuel cell system is built in a portion 300a that is exposed when an upper panel 300 rotates. In addition, the fuel tank can be independently mounted on a portion where the battery 310 is mounted, or can form a removable power unit together with the battery 310.

The above descriptions do not limit the scope of the present invention, but are provided as preferred examples of the invention. The fuel cell system can be applied to other types of mobile communication devices, for example, the DMB phone, by those who skilled in the art. In addition, two or more holes exposing the fuel storage medium can be formed in the fuel tank. Otherwise, instead of filling pure fuel in the fuel tank, the fuel mixed with water in the same mixture ratio in the fuel mixture unit can be filled in the fuel tank. Then, the fuel supplying path can be directly connected to the anode layer, and thus, the fuel mixture unit may not be required. In addition, the present invention can be applied to a general communication device, as well as a mobile communication device.

As described above, the mobile communication device of the present invention includes the secondary battery, and the fuel cell system including the cell pack on an idle region of the communication device, the fuel tank formed on the portion where the battery is installed, and the fuel supplying path supplying the fuel from the fuel tank to the cell pack. According to the present invention, since the fuel cell system is constructed using the idle area of the communication device, an increase in the thickness and volume of the communication device due to the fuel cell system can be minimized. In addition, the idle area, for example, an upper rear portion of the upper panel in the sliding type cellular phone, is exposed to atmosphere. In the communication device of the present invention, a path for inducing and discharging gas, for example, a hole, is formed on the idle area. Therefore, according to the present invention, the air can be induced freely, and gas generated during the operation of fuel cell system, that is, carbon dioxide, can be discharged freely. In addition, the heat generated when the fuel cell is used can be discharged rapidly.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell system for a mobile communication device, the fuel cell system comprising:
    a cell pack including an anode layer, a cathode layer, and an electrolyte;
    a fuel tank separated from the cell pack, and having a hole;
    a fuel mixture unit connected to the cell pack;
    a fuel storage medium included in the fuel tank, wherein a part of the fuel storage medium is exposed through the hole; and
    a fuel supplying path having a first end and a second end,
    wherein the fuel mixture unit and the cell pack are configured to be arranged in a first panel of the mobile communication device,
    wherein the fuel tank including the fuel storage medium is configured to be arranged in a second panel of the mobile communication device, and the second panel is configured to be moved relative to the first panel between a standby mode and a operating mode of the mobile communication device,
    wherein the first end of the fuel supplying path is connected to the fuel mixture unit, wherein in an operating mode, the fuel supplying path is moved with the fuel mixture unit and the cell pack and along the surface of the fuel tank so that the second end of the fuel supplying path is connected to the fuel storage medium, and in a standby mode the fuel supplying path is moved with the fuel mixture unit and the cell pack and along the surface of the fuel tank, so that the second end of the fuel supplying path is not connected to the fuel storage medium.

2. The fuel cell system of claim 1, wherein the fuel mixture unit includes:

a first capillary unit connected to the anode layer of the cell pack; and a second capillary unit connected to the cathode layer of the cell pack, wherein the first and the second capillary units are connected to the fuel supplying path.

3. The fuel cell system of claim 2, wherein the first and the second capillary units are formed as a porous medium or a wick structure through which a capillary force is applied.

4. The fuel cell system of claim 1, wherein the fuel supplying path is formed as a porous medium or a wick structure through which a capillary force is applied.

5. The fuel cell system of claim 1, wherein the fuel storage medium is a porous medium or a wick structure through which a capillary force is applied.

6. The fuel cell system of claim 1, wherein the fuel storage medium occupies one part of the fuel tank, and fuel fills another part of the fuel tank.

7. The fuel cell system of claim 1, wherein the fuel tank is filled with fuel, and the fuel storage medium is provided at the hole.

8. A mobile communication device comprising:
an upper panel including a display region;
a lower panel engaged with the upper panel, and including keys to input/output data and search information;
a power unit mounted on one of the upper panel and the lower panel; and
a fuel cell system having elements placed on the other one of the upper panel and the lower panel and on the power unit,
wherein the fuel cell system comprises:
a cell pack;
a fuel tank separated from the cell pack, and including a hole;
a fuel mixture unit connected to the cell pack;
a fuel storage medium included in the fuel tank, and a part of the fuel storage medium is exposed through the hole; and
a fuel supplying path having a first end and a second end,
wherein the fuel mixture unit and the cell pack are configured to be arranged in the upper panel of the mobile communication device,
wherein the fuel tank including the fuel storage medium is configured to be arranged in the lower panel of the mobile communication device, the lower panel is configured to be moved relative to the upper panel between a standby mode and a operating mode of the mobile communication device,
wherein the first end of the fuel supplying path is connected to the fuel mixture unit, wherein in an operating mode, the fuel supplying path is moved with the fuel mixture unit and the cell pack and along the surface of the fuel tank so that the second end of the fuel supplying path is connected to the fuel storage medium, and in a standby mode the fuel supplying path is moved with the fuel mixture unit and the cell pack and along the surface of the fuel tank, so that the second end of the fuel supplying path is not connected to the fuel storage medium.

9. The device of claim 8, wherein the cell pack includes an anode layer, a cathode layer, and an electrolyte.

10. The device of claim 9, wherein the fuel storage medium occupies a part of the fuel tank, and fuel fills another part of the fuel tank.

11. The device of claim 9, wherein the fuel storage medium is a porous medium or a wick structure.

12. The device of claim 9, wherein the fuel tank is filled with fuel, and the fuel storage medium is provided at the hole.

13. The device of claim 9, wherein the fuel mixture unit includes:
a first capillary unit connected to the anode layer of the cell pack; and
a second capillary unit connected to the cathode layer of the cell pack,
wherein the first and the second capillary units are connected to the fuel supplying path.

14. The device of claim 13, wherein the first and the second capillary units are formed as a porous medium or a wick structure through which a capillary force is applied.

15. The device of claim 9, wherein the fuel supplying path is formed as a porous medium or a wick structure through which a capillary force is applied.

16. The device of claim 9, wherein the fuel supplying path except for a portion contacting the fuel storage medium is located in the upper panel.

17. The device of claim 9, wherein a passageway through which the fuel supplying path passes is provided in the lower panel, and the fuel supplying path extends between the lower panel and the power unit.

18. The device of claim 17, wherein a part of the fuel supplying path that contacts the fuel storage medium is thicker than other portions of the fuel supplying path.

19. The device of claim 9, wherein the upper panel is movable with respect to the lower panel, and wherein the fuel supplying path is provided in a groove formed in a rear surface of the upper panel.

20. The device of claim 19, wherein the fuel supplying path is supported by an elastic frame, and wherein an end of the frame is fixed onto the upper panel.

21. The device of claim 19, wherein the keys of the lower panel are provided in a recessed region of the lower panel.

22. The device of claim 17, wherein the fuel supplying path is supported by an elastic frame, and an end of the frame is fixed onto a rear surface of the lower panel.

23. The device of claim 8, wherein the power unit includes a battery.

24. The device of claim 20, wherein the upper panel and the lower panel are coupled to each other to be slidable or rotatable with respect to each other.

25. A fuel cell system for a mobile communication device, the fuel cell system comprising:
a cell pack comprising at least one unit cell, each unit cell including an anode layer, a cathode layer, and an electrolyte;
a fuel tank separated from the cell pack, and having a hole;
a fuel mixture unit connected to the cell pack;
a fuel storage medium included in the fuel tank, wherein a part of the fuel storage medium is exposed through the hole; and
a fuel supplying path having a first end and a second end,
wherein the fuel mixture unit and the cell pack are configured to be arranged in a first panel of the mobile communication device,
wherein the fuel tank including the fuel storage medium is configured to be arranged in a second panel of the mobile communication device, and the second panel is configured to be moved relative to the upper panel between a standby mode and a operating mode of the mobile communication device,
wherein the first end of the fuel supplying path is connected to the fuel mixture unit, wherein in an operating mode, the fuel supplying path is moved with the fuel mixture unit and the cell pack and along the surface of the fuel tank so that the second end of the fuel supplying path is connected to the fuel storage medium, and in a standby mode the fuel supplying path is moved with the fuel mixture unit and the cell pack and along the surface of the fuel tank so that the second end of the fuel supplying path is not connected to the fuel storage medium.

26. The device of claim 8, wherein the cell pack comprises at least one unit cell, each unit cell including an anode layer, a cathode layer, and an electrolyte.

27. A mobile communication device comprising:
an upper panel including a display region;
a lower panel engaged with the upper panel, and including keys to input/output data and search information;
a power unit mounted on one of the upper panel and the lower panel; and
a fuel cell system having elements placed on the other one of the upper panel and the lower panel and on the power unit, wherein the fuel cell system comprises:
a cell pack including an anode layer, a cathode layer, and an electrolyte;
a fuel tank separated from the cell pack, and including a hole;
a fuel mixture unit connected to the cell pack;
a fuel storage medium included in the fuel tank, and a part of the fuel storage medium is exposed through the hole; and
a fuel supplying path having a first end connected to the fuel mixture unit and a second end,
wherein the fuel mixture unit and the cell pack are configured to be arranged in the upper panel,
wherein the fuel tank including the fuel storage medium is configured to be arranged in the lower panel,
wherein in an operating mode, the fuel supplying path is moved with the fuel mixture unit and the cell pack and along the surface of the fuel tank so that the second end of the fuel supplying path is connected to the fuel storage medium, and in a standby mode the fuel supplying path is moved with the fuel mixture unit and the cell pack and along the surface of the fuel tank so that the second end of the fuel supplying path is not connected to the fuel storage medium and
wherein the lower panel and the upper panel have guide rails that slidably engage to allow the lower panel and the upper panel to be slidably moved relative to each other between the standby mode and the operating mode.

28. The mobile communication device of claim 27, wherein the cell pack is located in the upper panel and the fuel tank is located in the lower panel.

29. The mobile communication device of claim 28, wherein the lower panel includes a passageway that connects the hole of the fuel tank with the second end of the fuel supplying path in the operating mode.

30. A mobile communication device comprising:
an upper panel including a display region;
a lower panel engaged with the upper panel, and including keys to input/output data and search information;
a power unit mounted on one of the upper panel and the lower panel; and
a fuel cell system having elements placed on the other one of the upper panel and the lower panel and on the power unit, wherein the fuel cell system comprises:
a cell pack including an anode layer, a cathode layer, and an electrolyte;
a fuel tank separated from the cell pack, and including a hole;
a fuel mixture unit connected to the cell pack;
a fuel storage medium included in the fuel tank, and a part of the fuel storage medium is exposed through the hole; and
a fuel supplying path having a first end connected to the fuel mixture unit and a second end, wherein in an operating mode, the fuel supplying path is moved with the fuel mixture unit and along the surface of the fuel tank so that the second end of the fuel supplying path is connected to the fuel storage medium, and in a standby mode the fuel supplying path is moved with the fuel mixture unit and along the surface of the fuel tank so that the second end of the fuel supplying path is not connected to the fuel storage medium and
wherein the lower panel and the upper panel have guide rails that slidably engage to allow the lower panel and the upper panel to be slidably moved relative to each other between the standby mode and the operating mode,
wherein the cell pack is located in the upper panel and the fuel tank is located in the lower panel,
wherein the lower panel includes a passageway that connects the hole of the fuel tank with the second end of the fuel supplying path in the operating mode, and
wherein the fuel supplying path includes a middle section that bends away from the lower panel so that the fuel supplying path does not contact the fuel storage medium in the standby mode.

31. The mobile communication device of claim 29, wherein the fuel supplying path includes a middle section that is surrounded by a protective layer so that the fuel supplying path does not contact the fuel storage medium in the standby mode.

32. The mobile communication device of claim 28, wherein the cell pack is located in an idle portion of the upper panel.

33. The fuel cell system of claim 1, wherein the fuel supplying path includes a middle section that bends away from the fuel storage medium so that the fuel supplying path does not contact the fuel storage medium in the standby mode.

* * * * *